(12) United States Patent
Shand et al.

(10) Patent No.: US 7,577,106 B1
(45) Date of Patent: Aug. 18, 2009

(54) METHOD AND APPARATUS FOR MANAGING A TRANSITION FOR A CLASS OF DATA BETWEEN FIRST AND SECOND TOPOLOGIES IN A DATA COMMUNICATIONS NETWORK

(75) Inventors: Ian Michael Charles Shand, Cobham (GB); Stewart Frederick Bryant, Redhill (GB)

(73) Assignee: Cisco Technology, Inc., San Jose, CA (US)

( * ) Notice: Subject to any disclaimer, the term of this patent is extended or adjusted under 35 U.S.C. 154(b) by 694 days.

(21) Appl. No.: 10/890,047

(22) Filed: Jul. 12, 2004

(51) Int. Cl.
*H04L 12/26* (2006.01)

(52) U.S. Cl. .................. 370/254; 370/255; 370/256; 370/235; 370/229; 709/239; 359/124; 359/125

(58) Field of Classification Search ............... 370/254, 370/349, 408, 389, 256, 229, 255; 709/239, 709/242, 252; 717/144, 105; 359/124, 125
See application file for complete search history.

(56) References Cited

U.S. PATENT DOCUMENTS

| | | | |
|---|---|---|---|
| 5,243,592 A | 9/1993 | Perlman et al. | |
| 5,253,248 A | 10/1993 | Dravida et al. | |
| 5,627,822 A | 5/1997 | Edmaier et al. | |
| 5,652,751 A | 7/1997 | Sharony | |
| 5,854,899 A | 12/1998 | Callon et al. | |
| 5,959,968 A | 9/1999 | Chin et al. | |
| 5,999,286 A | 12/1999 | Venkatesan | |
| 6,075,631 A * | 6/2000 | Bala et al. ............ | 398/1 |
| 6,111,257 A | 8/2000 | Shand et al. | |
| 6,148,410 A | 11/2000 | Basket et al. | |
| 6,243,754 B1 | 6/2001 | Guerin et al. | |
| 6,295,275 B1 | 9/2001 | Croslin | |
| 6,321,271 B1 | 11/2001 | Kodialam et al. | |
| 6,343,122 B1 | 1/2002 | Andersson | |
| 6,349,091 B1 | 2/2002 | Li | |
| 6,389,764 B1 | 5/2002 | Stubler et al. | |
| 6,473,421 B1 | 10/2002 | Tappan | |
| 6,507,577 B1 | 1/2003 | Mauger et al. | |
| 6,535,481 B1 | 3/2003 | Andersson et al. | |
| 6,578,086 B1 | 6/2003 | Regan et al. | |
| 6,668,282 B1 | 12/2003 | Booth et al. | |

(Continued)

FOREIGN PATENT DOCUMENTS

CN 1440159 A 9/2003

OTHER PUBLICATIONS

Wang, Zheng et al., "Shortest Path First with Emergency Exits," ACM 089791-405-8/90/0009/0166, 1990, pp. 166-176.

(Continued)

*Primary Examiner*—Ricky Ngo
*Assistant Examiner*—David Oveissi
(74) *Attorney, Agent, or Firm*—Hickman Palermo Truong & Becker LLP

(57) ABSTRACT

A method is disclosed of managing a transition for a class of data between first and second topologies in a data communications network comprising a plurality of nodes and supporting multiple topologies. The method comprises the steps, performed at a participating node, of defining a transition topology, marking data in said class as assigned to the transition topology; and forwarding marked data only among nodes within said transition topology.

26 Claims, 10 Drawing Sheets

U.S. PATENT DOCUMENTS

| | | |
|---|---|---|
| 6,690,671 B1 | 2/2004 | Anbiah et al. |
| 6,697,325 B1 | 2/2004 | Cain |
| 6,714,551 B1 | 3/2004 | Le-Ngoc |
| 6,829,215 B2 | 12/2004 | Tornar |
| 6,879,594 B1 * | 4/2005 | Lee et al. .................... 370/408 |
| 6,944,131 B2 | 9/2005 | Beshai et al. |
| 6,982,951 B2 | 1/2006 | Doverspike et al. |
| 7,058,016 B1 | 6/2006 | Harper |
| 7,099,286 B1 | 8/2006 | Swallow |
| 7,113,481 B2 | 9/2006 | Elie-Dit-Cosaque et al. |
| 7,260,645 B2 | 8/2007 | Bays |
| 7,292,581 B2 * | 11/2007 | Finn ...................... 370/395.53 |
| 7,330,440 B1 * | 2/2008 | Bryant et al. ............... 370/254 |
| 7,349,427 B1 | 3/2008 | Canning et al. |
| 2002/0093954 A1 | 7/2002 | Weil et al. |
| 2002/0112072 A1 | 8/2002 | Jain |
| 2002/0116669 A1 | 8/2002 | Jain |
| 2002/0136223 A1 | 9/2002 | Ho |
| 2002/0147800 A1 | 10/2002 | Gai et al. |
| 2002/0171886 A1 | 11/2002 | Wu et al. |
| 2003/0193959 A1 | 10/2003 | Lui et al. |
| 2003/0223361 A1 * | 12/2003 | Hussain et al. .............. 370/230 |
| 2004/0001497 A1 | 1/2004 | Sharma |
| 2004/0001508 A1 | 1/2004 | Zheng et al. |
| 2004/0017796 A1 * | 1/2004 | Lemieux et al. ............. 370/349 |
| 2004/0071089 A1 | 4/2004 | Bauer et al. |
| 2004/0085894 A1 | 5/2004 | Wang et al. |
| 2005/0007950 A1 | 1/2005 | Liu |
| 2005/0031339 A1 | 2/2005 | Qiao et al. |
| 2005/0050220 A1 | 3/2005 | Rouyer et al. |
| 2005/0097219 A1 | 5/2005 | Goguen et al. |
| 2007/0011284 A1 | 1/2007 | Le Roux et al. |
| 2007/0038767 A1 | 2/2007 | Miles et al. |

OTHER PUBLICATIONS

AU Examiner's First Report for foreign patent application No. 2004311004 dated Jun. 23, 2008 (1 pg).
AU Examiner's Second Report for foreign patent application No. 2004311004 dated Aug. 18, 2008 (1 pg).
Current claims for AU foreign patent application No. 2004311004 (6 pgs).
Office Action from CN for foreign application No. 200480033007.8 dated Apr. 11, 2008 (10 pgs) with English translation (11 pgs).
Current claims for CN foreign patent application No. 200480033007.8 (6 pgs).
International Searching Authority, International Search Report, PCT/US04/33827, dated Mar. 28, 2005, 8 pages.
Current Claims, PCT/US04/33827, 6 pages, dated Mar. 28, 2005. Cited by other.

* cited by examiner

METHOD AND APPARATUS FOR MANAGING A TRANSITION FOR A CLASS OF DATA BETWEEN FIRST AND SECOND TOPOLOGIES IN A DATA COMMUNICATIONS NETWORK

FIELD OF THE INVENTION

The present invention generally relates to forwarding data in a data communications network. The invention relates more specifically to a method and apparatus for managing a transition for a class of data between first and second topologies in a data communications network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (for example, routers directing the packet along one or more of a plurality of links connected to it) according to one of various routing protocols.

One class of routing protocol is the link state protocol. The link state protocol relies on a routing algorithm resident at each node. Each node on the network advertises, throughout the network, links to neighboring nodes and provides a cost associated with each link, which can be based on any appropriate metric such as link bandwidth or delay and is typically expressed as an integer value. A link may have an asymmetric cost, that is, the cost in the direction AB along a link may be different from the cost in a direction BA. Based on the advertised information in the form of a link state packet (LSP) each node constructs a link state database (LSDB), which is a map of the entire network topology, and from that constructs generally a single optimum route to each available node based on an appropriate algorithm such as, for example, a shortest path first (SPF) algorithm. As a result a "spanning tree" (SPT) is constructed, rooted at the node and showing an optimum path including intermediate nodes to each available destination node. The results of the SPF are stored in a routing information base (RIB) and based on these results the forwarding information base (FIB) or forwarding table is updated to control forwarding of packets appropriately. When there is a network change an LSP representing the change is flooded through the network by each node adjacent the change, each node receiving the LSP sending it to each adjacent node.

As a result, when a data packet for a destination node arrives at a node (the "first node"), the first node identifies the optimum route to that destination and forwards the packet to the next node along that route. The next node repeats this step and so forth.

It will be noted that in normal forwarding each node decides, irrespective of the node from which it received a packet, the next node to which the packet should be forwarded. In some instances this can give rise to a "loop". In particular this can occur when the databases (and corresponding forwarding information) are temporarily de-synchronized during a routing transition, that is, where because of a change in the network, a new LSP is propagated that induces creating a loop in the RIB or FIB. As an example, if node A sends a packet to node Z via node B, comprising the optimum route according to its SPF, a situation can arise where node B, according to its SPF determines that the best route to node Z is via node A and sends the packet back. This can continue for as long as the loop remains although usually the packet will have a maximum hop count after which it will be discarded. Such a loop can be a direct loop between two nodes or an indirect loop around a circuit of nodes.

Another instance in which loops can occur is during a transition between topologies in a network supporting multi-topology routing. Multi-topology routing is described in "M-ISIS: Multi-topology routing in IS-IS" by T. Przygienda et al., which is available at the time of writing on the file "isis-wg-multi-topology-00.txt" in the directory proceedings/01mar/I-D" of the domain "IETF.org" of the world wide web. In multi-topology routing one or more additional topologies is overlaid on a base or default topology and different classes of data are assigned to different topologies. For example the base or default topology will be the entire network and an additional topology will be a subset of the default topology. It will be appreciated that the physical components of the network are common to both topologies but that for various reasons it may be desirable to assign certain classes of traffic to only a certain subset of the entire network as a result of which the multi-topology concept provides a useful approach to providing this functionality.

One example of the use of multiple topologies is where one class of data requires low latency links, for example Voice over Internet Protocol (VoIP) data. As a result such data may be sent preferably via physical landlines rather than, for example, high latency links such as satellite links. As a result an additional topology is defined as all low latency links on the network and VoIP data packets are assigned to the additional topology. Another example is security-critical traffic which may be assigned to an additional topology of non-radiative links. Further possible examples are file transfer protocol (FTP) or SMTP (simple mail transfer protocol) traffic which can be assigned to an additional topology comprising high latency links, Internet Protocol version 4 (IPv4) versus Internet Protocol version 6 (IPv6) traffic which may be assigned to different topologies or data to be distinguished by the quality of service (QoS) assigned to it.

Multi-topology routing can be performed in a strict or a preferred mode. In the strict mode a data packet must travel only over the assigned topology and otherwise be discarded, for example in the case of security critical traffic. In the preferred mode data packets are preferably sent over the assigned topology but may also pass through the default topology where there is no path using only the assigned topology; thus, the assigned topology is considered preferred, but not strictly required. However a constraint on preferred mode traffic is that once traffic enters its preferred topology it must travel exclusively over that topology to the destination and not reenter the default topology as otherwise looping could occur.

Problems can arise in multi-topology routing domains during transitions between topologies and in particular migrating packet classifications from one topology to another without packets looping. Such transitions can occur for example during introduction of a first or subsequent additional topology, the removal of a topology, the addition or removal of a class of data packets to or from an additional topology (other classes of data remaining within the topology) or changing a class of data between two additional topologies (other classes of data remaining within the existing topology).

In such cases, assuming that each topology is stable and loop free, a single hop loop can occur if a first router classifies a packet as belonging to a first topology and forwards it to a neighboring second router. If the second router then classifies the packet as belonging to another topology it may forward the packet back to the first router, both routers having computed the shortest route to the packet destination using a different set of metrics, each appropriate to the topology to which they classified the packet. It will be seen that such a situation could arise when a transition between topologies is taking place according to which some routers have implemented the transition and others have not. A multi-hop loop can also occur if the topologies use asymmetric metrics.

The situation can be further understood with reference to FIG. 1, which depicts an illustrative network diagram of a multi-topology routing domain. For purposes of visualization of the network the default network is shown in a first plane and the additional topology is shown superposed in a second parallel plane. However it will be appreciated that the default and additional topologies are in fact physically formed from the same physical components, sharing common nodes and links, each node being configured to forward data packets over either topology dependent on the classification of the data packet. Furthermore, for the purposes of comprehensibility, and in particular to allow distinction between multiple additional topologies, the topologies other than the default topology are assigned colors and the data to be carried by that topology identified by the same color. It will be appreciated that any appropriate nomenclature can be adopted and that any such nomenclature is used for the purposes of explanation only.

In the network shown in FIG. 1 nodes A, reference numeral 10, B, reference numeral 12, C, reference numeral 14 and D, reference numeral 16 comprise a fragment of a data communications network forming a default topology designated generally 18. A link 20 joins nodes A and B, a link 22 joins nodes B and C, a link 24 joins nodes C and D and a link 26 joins nodes A and D. All of the links have a cost 1 except for link 26 joining nodes A and D which has a cost 10.

An additional topology which may be denoted a "blue" topology 28 is defined sharing nodes A, B, C and D and the common links 20, 22, 24, 26 between them (denoted here 22', 24', 26', 28' for the purposes of clarity of illustration) and in the blue topology all the links have a cost 1 except for the link 20' between nodes A and B which has a cost 10.

It will be seen, therefore, that the additional topology is effectively defined by identifying the links belonging to it and assigning appropriate costs, which may differ from the costs in other topologies. In normal operation, normal data will be forwarded along the default topology 18 and "blue" data (identified in a classification step) will be forwarded along the additional topology 28. However where the additional topology is, for example, being installed then a situation may arise where node B installs the new topology before node C. As a result node C will not recognize blue traffic as requiring a separate topology and will forward it towards a destination node A via the lowest cost route in the default topology, i.e. node B. However when the data packet arrives at node B this will recognize that it should be forwarded via the additional blue topology 28 and will recognize the shortest cost route to node A as being via node C. In this case node C will once again forward it to node B and it will be seen that a loop is set up. Until the network fully establishes the new additional topology, data will be lost and bandwidth unnecessarily consumed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for managing a transition for a class of data between first and second topologies in a data communications network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| | |
|---|---|
| 1.0 | General Overview |
| 2.0 | Structural and Functional Overview |
| 3.0 | Method of Managing a Transition between Topologies |
| 4.0 | Implementation Mechanisms - Hardware Overview |
| 5.0 | Extensions and Alternatives |

1.0 General Overview

The needs identified in the foregoing Background, and other needs and objects that will become apparent for the following description, are achieved in the present invention, which comprises, in one aspect, a method for managing a transition for a class of data between first and second topologies in a data communications network comprising a plurality of nodes and supporting multiple topologies. The method comprises the step, performed at a participating node, of defining a transition topology. The method further comprises the step of marking data in said class as assigned to the transition topology and forwarding marked data via said transition topology.

In other aspects, the invention encompasses a computer apparatus and a computer-readable medium configured to carry out the foregoing steps.

2.0 Structural and Functional Overview

Figure 2:
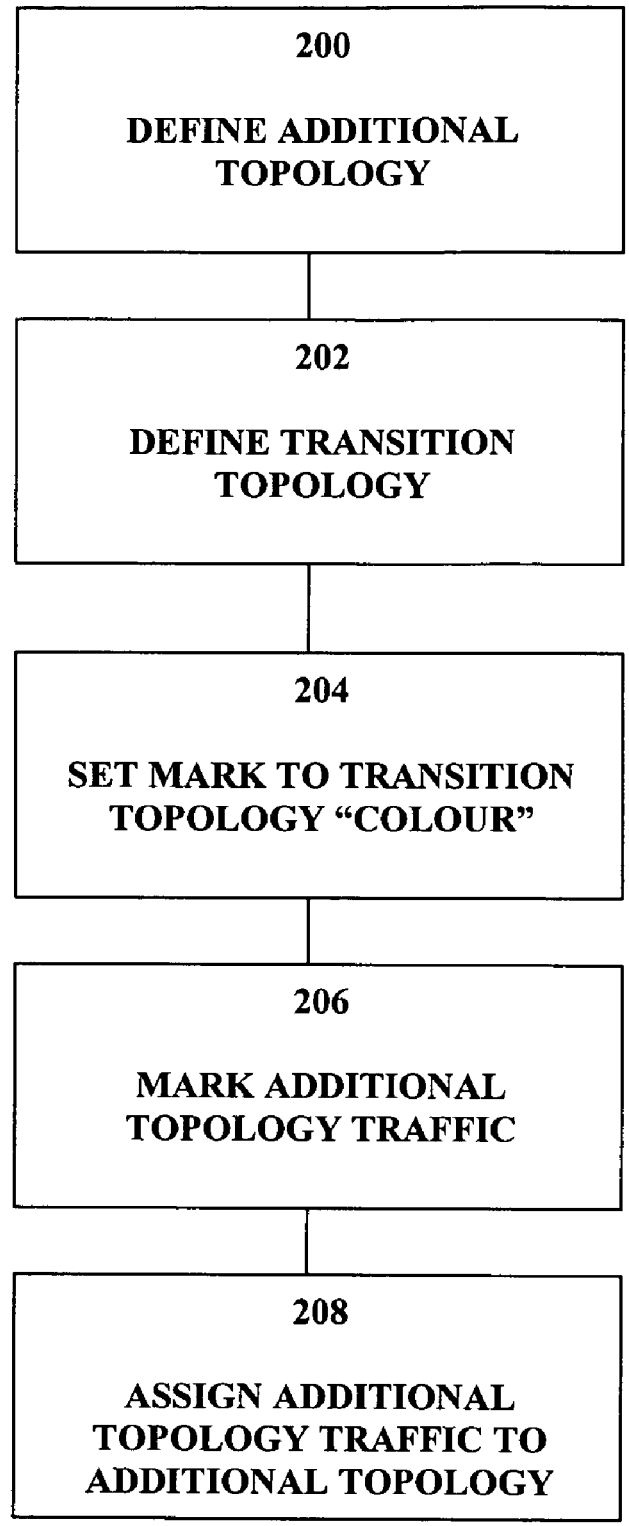
FIG. 2 is a flow diagram illustrating a high level view of a method for managing a transition between topologies.

In overview a method of managing a transition between topologies in a network supporting multi-topology routing is provided which can be understood with reference to FIG. 2 which is a flow diagram illustrating a high level view of the method employed.

In block 200 an additional topology is defined. For example with reference to the network shown in FIG. 1 the additional topology 28 which is denoted the "blue" topology purely for the purposes of explanation, is defined, and routers within the topology are termed "blue routers" and packets of traffic assigned to the topology are termed "blue packets". In block 202 a "transition topology" is defined and assigned a denominator allowing identification of the topology. In most circumstances the transition topology will be an existing defined topology such as the default topology or an additional topology and the denominator selected accordingly, for example "default" or "blue" or the "color" otherwise assigned to the topology adopted as the transition topology. Alternatively, an entirely new topology is defined as the transition topology and is assigned a new denominator or color.

As discussed in more detail below, packets affected by the transition between topologies are locked into the transition topology during a transition period to avoid looping. In particular, in block 204 a marking strategy is established according to which marked packets are assigned to the transition topology as denominated by its "color". In block 206 the marking strategy is configured such that traffic for the additional topology, that is, "blue" traffic, is marked at the router implementing the method. A marked packet is constrained to travel in the topology assigned to the marking in block 204, i.e. to the transition topology "color". Marking takes priority over all other attributes when determining the topology over which a packet is to be routed. Once the marking strategy is implemented in all participating routers in block 208 marking of traffic for the additional topology ceases at the participating routers and subsequent traffic for the additional topology is classified accordingly and forwarded along the additional topology. This step can be performed in any order amongst the participating routers. At this stage the additional topology, for example the blue topology, is an active topology.

Looping is avoided according to this method because the marked traffic is locked down into the default topology whilst the marking strategy is implemented across all participating routers. In the case where the additional topology is a blue topology, as a result, if a blue packet is forwarded to a blue router that has not yet switched on the marking strategy it will be forwarded normally until it reaches its destination or is marked by another node at which point it will enter the transition topology and be locked there. Once the participating routers start to cease marking of traffic, if a blue packet is forwarded to a blue router that has not yet switched off the marking strategy, the blue packet is marked and forwarded to its destination using the transition topology. Because marking has priority over classification the packet is now locked into the transition topology and will be maintained in the transition topology by all other routers. Even if the routers are no longer marking blue traffic themselves, they will recognize a marked packet and also forward it over the transition topology. It will be noted that although the packet cannot loop, it can backtrack, that is, it may travel over a link no more than once in each direction, once in each of the transition and additional topologies.

Figure 1:
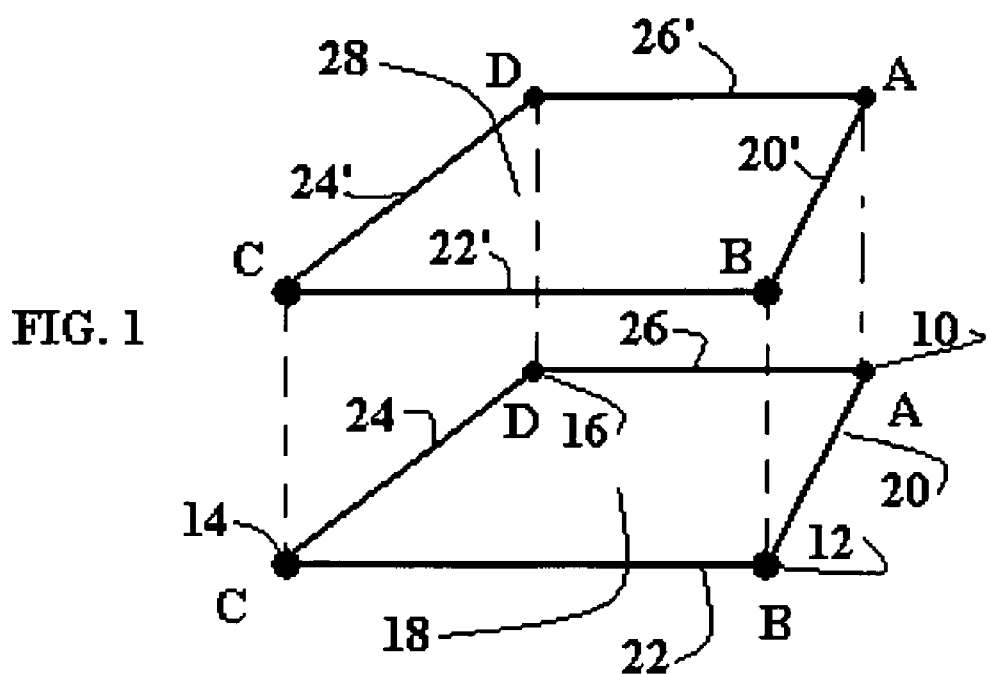
FIG. 1 is a representation of a network supporting multi-topology routing.

This can be understood further referring to FIG. 1. In the case of a packet arriving at the edge of the blue, additional topology 28, if all the nodes on its path have switched off marking and are classifying blue traffic then the packet will travel to its destination as a blue packet along the blue, additional topology. However if the node via which it enters the blue topology, the blue edge router, has not switched off marking then all blue packets entering the blue topology via that node will be marked as "transition" (in this case, also the blue topology) and forwarded by the transition topology rather than via the blue topology. Similarly if one of the other nodes in the blue topology has not yet switched off marking then that node will mark the packet and forward it on the transition topology. As a result it may forward the packet back to its blue topology upstream neighbor but this neighbor will also forward the packet on the transition topology. As each individual topology is defined as non-looping it will be seen that although the packet may backtrack any distance it will not loop.

In one embodiment, the default topology is used as the transition topology. In an alternative embodiment, a receiving router detects that a packet is in transit from, for example, a red topology to a blue topology, and in response, a union of the red topology and the blue topology is created and assigned as the transition topology. This embodiment is appropriate, for example, when the red topology and blue topology are operating in strict mode, because the packet is automatically constrained within the newly formed transition topology. As a result of the method described with reference to FIG. 2, the problem of adding and removing a prefix from a multi-topology routing domain and migrating a prefix from one multi-topology routing domain to another is solved without packets looping and ensuring that the packets behave according to the constraints adopted in multi-topology routing during the transition. In particular this is achieved by locking the classification of packets into a defined topology, then effecting the transition of the classification of the packets and then unlocking the classification of the packets once again, using the marking strategy used above.

As described in more detail below the method of managing the transition can be applied to any type of topology transition and used equally in strict or preferred mode.

3.0 Method of Managing a Transition Between Topologies

For purposes of illustrating a clear example, the method described herein in some instances refers to its applicability in relation to a network of the type shown in FIG. 1. However the method described herein is not limited to the context of FIG. 1 and may be applied to any appropriate multi-topology routing domain.

As indicated above, the method described herein can be applied to any appropriate topology change, for example introduction of a first additional topology, introduction of a subsequent additional topology, removal of an additional topology, addition of packets to an additional topology classification, removal of packets from an additional topology classification or changing classification of packets between additional topologies.

Figure 3:
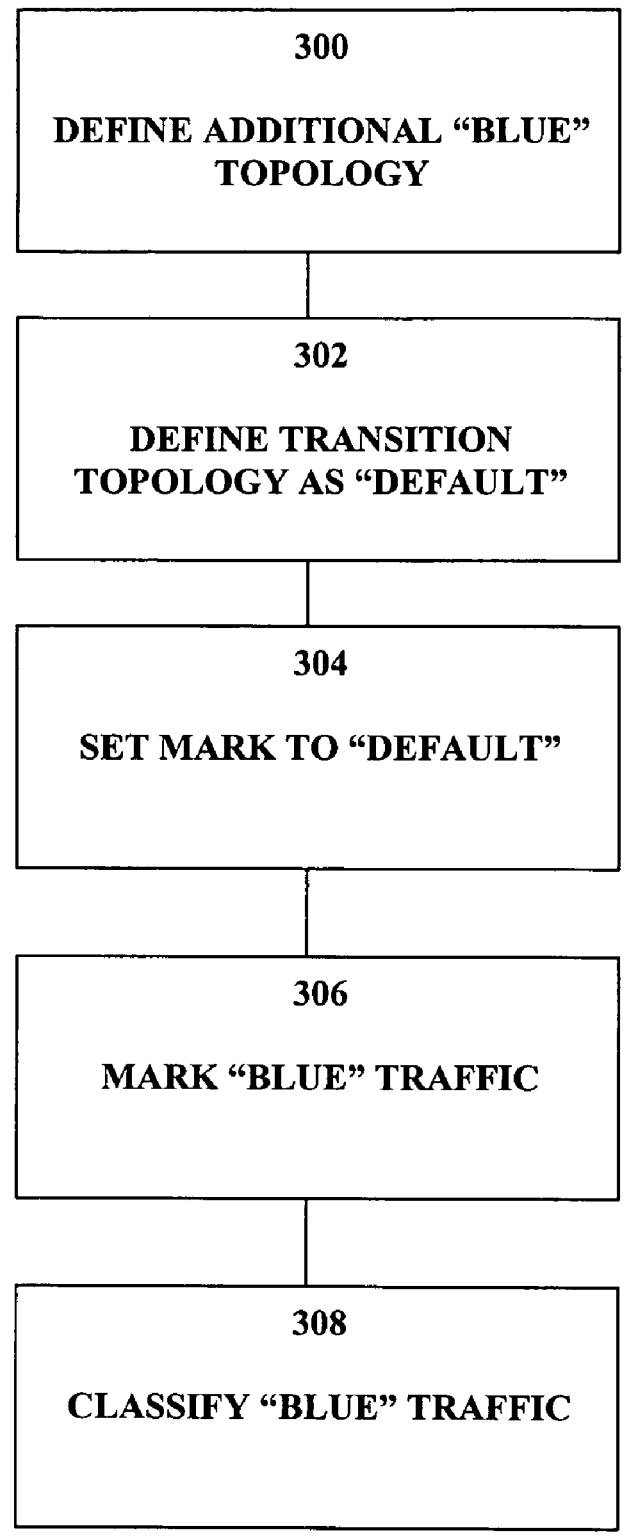
FIG. 3 is a flow diagram illustrating in more detail steps involved in introducing a first additional topology.

FIG. 3 shows a flow diagram illustrating in more detail the method applied to the introduction of a first additional topology. Initially the network starts in a state where the only defined topology is the default topology comprising the entire network. In block 300 the new topology is defined and once again, for the purposes of clarity of explanation, this will be denominated the "blue" topology hereafter. Additional topology information, for example, the new "color" is added to the links to be used by the blue topology and the costs set according to the new topology. Routing in the blue topology is enabled for example according to the link state protocol described above and the system waits for routing to converge. At this point a viable blue topology exists but packets are not yet classified as blue and hence the blue topology does not carry any data. Once the transition topology has been installed and the network has converged on it then the subsequent steps can be undertaken. Identification can be made, for example, by a signaling procedure as described below.

In block 302 the transition topology is defined as the default topology and the color is accordingly set to "default". As the packets were originally being carried in the default topology, locking them into the default topology as transition topology makes no difference to their path. In block 304 the mark is set to the transition topology color, that is, default. The method of marking must be consistent through the network. Methods of marking include the use of an appropriate bit in the packet, for example a differentiated services code point (DSCP) bit marking the packet as "transition", overriding one of the high order identification bits, or using an encapsulation. In the latter case the packet is tunneled to the destination and the marking method applied to the tunnel header for example using the DSCP or a parameter within the tunnel encapsulation such as tunnel key. As a result the marking method does not change the packet contents.

In block 306 blue traffic, that is, traffic which will be assigned to the blue topology, is marked. Marking the traffic mandates that blue traffic is carried over the transition topology, in this case the default topology. It will be seen that implementation of the method at each node on the network can take place in any order as the packets are locked into the default topology which was carrying them anyway.

Each participating node carries on marking blue traffic until all participating nodes have implemented the marking strategy in blocks 304 and 306. Once this has occurred the participating nodes can cease marking additional blue traffic. This stage of the transition can be triggered in any appropriate manner. For example each participating node can signal to all other participating nodes when it has implemented marking. Alternatively all participating nodes can delay a common predetermined period from receipt of a synchronization signal after which marking should have been implemented universally. Alternatively again it would be possible to trigger the next stage of transition manually by the network administration from looking at management information, as the method can be invoked over longer duration periods if necessary.

Then, in block 308, blue traffic is simply classified accordingly and hence assigned to the blue topology. This is implemented at each participating node and it will be seen that the order in which the participating nodes cease marking blue traffic and commence simply classifying blue traffic is immaterial. This is because all participating nodes continue to assign marked traffic to the transition topology in which it is then locked even if they have ceased marking the traffic themselves, as a result of which looping cannot occur.

Figure 4:
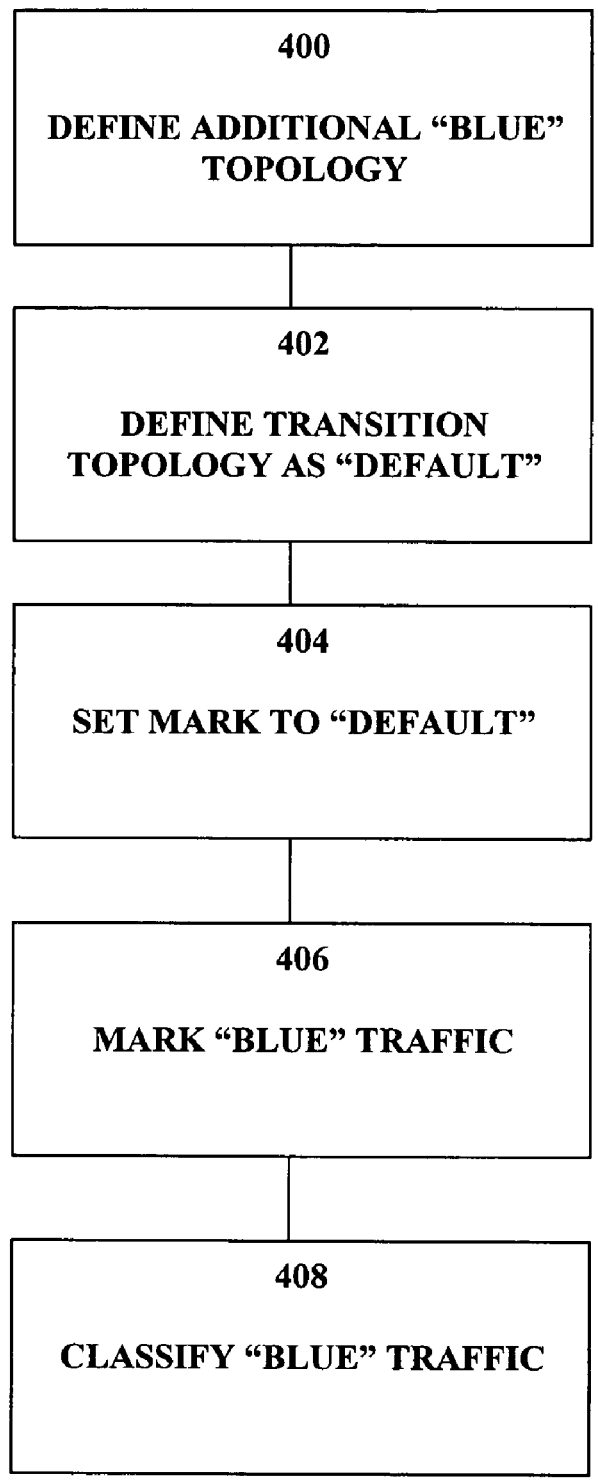
FIG. 4 is a flow diagram illustrating in more detail steps involved in introducing a subsequent additional topology.

FIG. 4 shows a flow diagram illustrating in more detail the method applied in the case of introduction of a subsequent additional topology, at least one additional topology already being active. In this case, in addition to avoiding looping packets, it is important not to disturb the running additional topology. For the purposes of clarity of explanation it is assumed that the existing active topology is "red" and the subsequent additional topology being installed is "blue".

Because the topologies are orthogonal the same steps can generally be adopted as for introducing the first additional topology, described with reference to FIG. 3 above.

In particular, in block 400 the additional blue topology is defined. In block 402 the transition topology is defined as default. In block 404 the mark is set to default. In block 406 blue traffic is classified as marked whilst all participating nodes implement the marking strategy. After this has occurred, in block 408 blue traffic is classified as blue and assigned to the blue additional topology in the normal manner. Once again, therefore, looping is avoided by locking blue packets into the transition topology during the transition.

Figure 5:
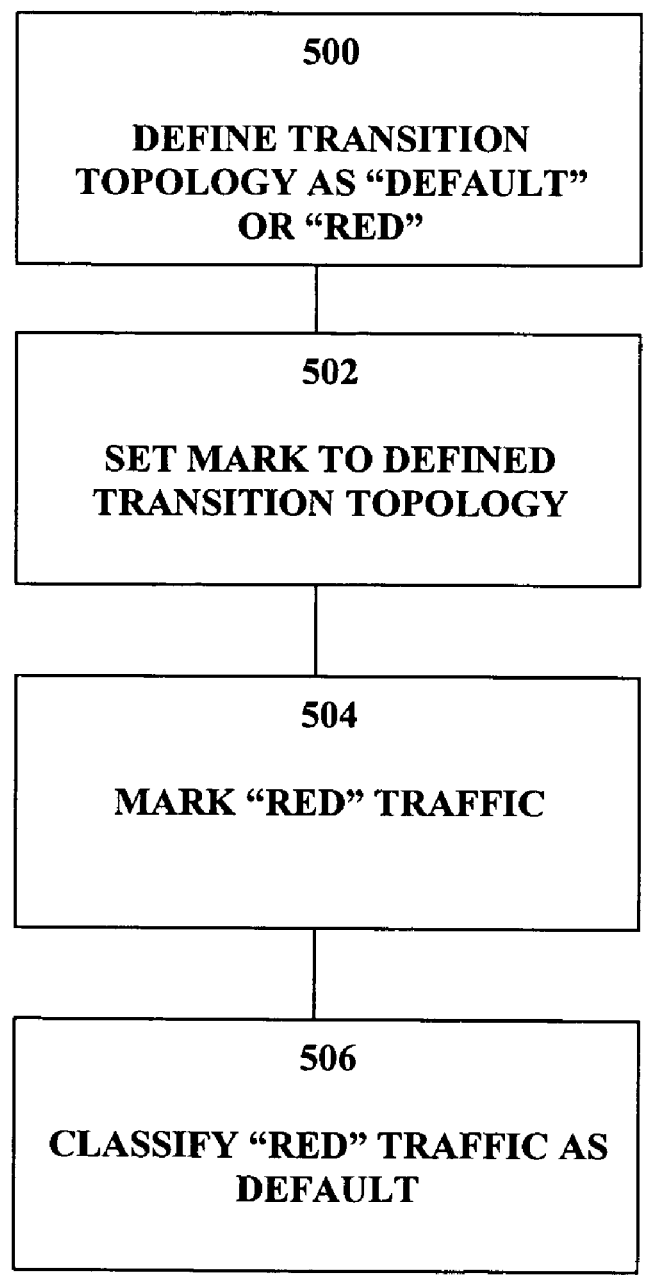
FIG. 5 is a flow diagram illustrating in more detail steps involved in removing an additional topology.

FIG. 5 shows a flow diagram illustrating in more detail the method applied in the case of removal of an active additional topology. For the purposes of clarity of explanation it is assumed that active red and blue topologies are running on the network and it is required to remove the red topology. Red packets have to be changed from being routed in the red topology to being routed in the default topology.

In this case a similar approach to that described above with reference to FIGS. 3 and 4 is applied but with some changes. In particular it will be noted it is not necessary to define the additional topology as it is already defined in the form of the default topology.

In block 500 the transition topology is defined; it will be noted that here the transition topology is defined as default or red—the approach will work successfully whether traffic is locked into the new topology (default) or the old topology (red) as long as the mark is set accordingly and all nodes choose the same transition topology. In block 502, the mark is thus set to either default or red dependent upon which was defined as the transition topology. In block 504, "red" traffic, that is the traffic using the topology to be deleted is marked and hence forwarded in the transition topology. In block 506, once the marking strategy has been implemented by all implementing nodes, red traffic is classified as default. Once all participating nodes have ceased marking, the deleted topology can be fully removed. Removal of the deleted topology can be carried out at any appropriate time. However it may be desirable to retain the transition topology for future use as it will not have any traffic assigned to it.

Figure 6A:
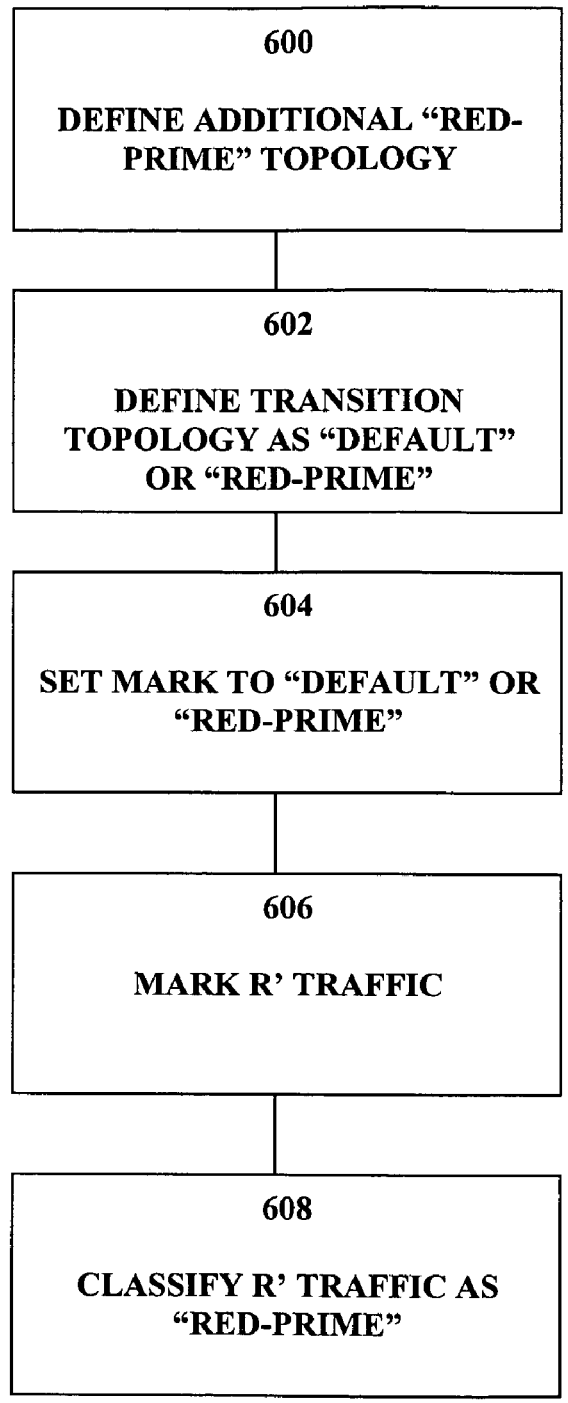
FIG. 6A is a flow diagram illustrating in more detail steps involved in adding packets to an additional topology classification.
Figure 6B:
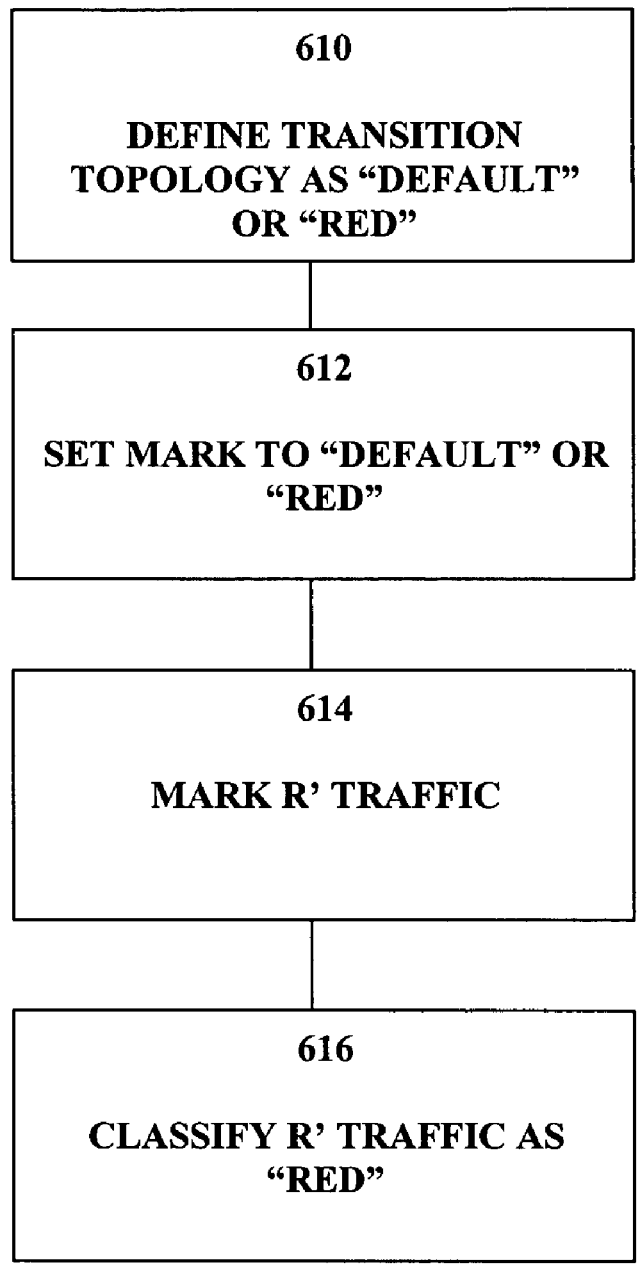
FIG. 6B is a flow diagram illustrating in more detail steps involved in adding packets to an additional topology classification according to an alternative approach.

FIGS. 6A and 6B show flow diagrams illustrating in more detail two alternative implementations of the method applied in the case where packets are added to a classification. In such circumstances an established active additional topology which for the purposes of clarity of explanation is denoted a red topology exists. In addition a class of packets is already assigned to the red topology which we denominate classification R. An additional class of packets which can be denoted R' is currently being carried in the default topology and it is desired to add the further class of packets R' to the red topology. For example the established classification R may be all packets in a quality of service (QoS) class A and the class of packets R' may be all packets in QoS class B. The method addresses this either by creating a new topology "red-prime" congruent with "red" or by classifying R' packets into the existing red topology. In either case, the process is effectively the same as the process used to introduce a new topology.

In the first case, as shown in FIG. 6A, a red prime topology is created such that R' packets will be classified as red prime packets. In particular in block 600 the red prime topology is defined. In block 602 the transition topology is defined as default or red prime. In block 604 the mark is set to default or red prime dependent on the transition topology selected. In block 606 R' traffic is marked and in block 608, when the marking strategy has been implemented in all participating nodes, R' traffic is classified as red prime. As a result the additional class of packets is now assigned to the same topology as the red topology although using an additional color red-prime.

Referring to FIG. 6B the creation of an additional red-prime topology is omitted and the additional class of packets is classified into the existing red topology, in an optimization. In this case no additional topology needs to be defined as the existing red topology is used. In block 610 the transition topology is defined as default or red. In block 612 the mark is set in relation to the selected transition topology. In block 614 R' traffic is marked and in block 616, once the marking strategy has been implemented for all participating nodes, R' traffic is classified as red and forwarded on the red topology.

In an optimization an additional class may be defined merging R and R' which could be appropriate, for example, in the case where R and R' denote together all packets.

Figure 7:
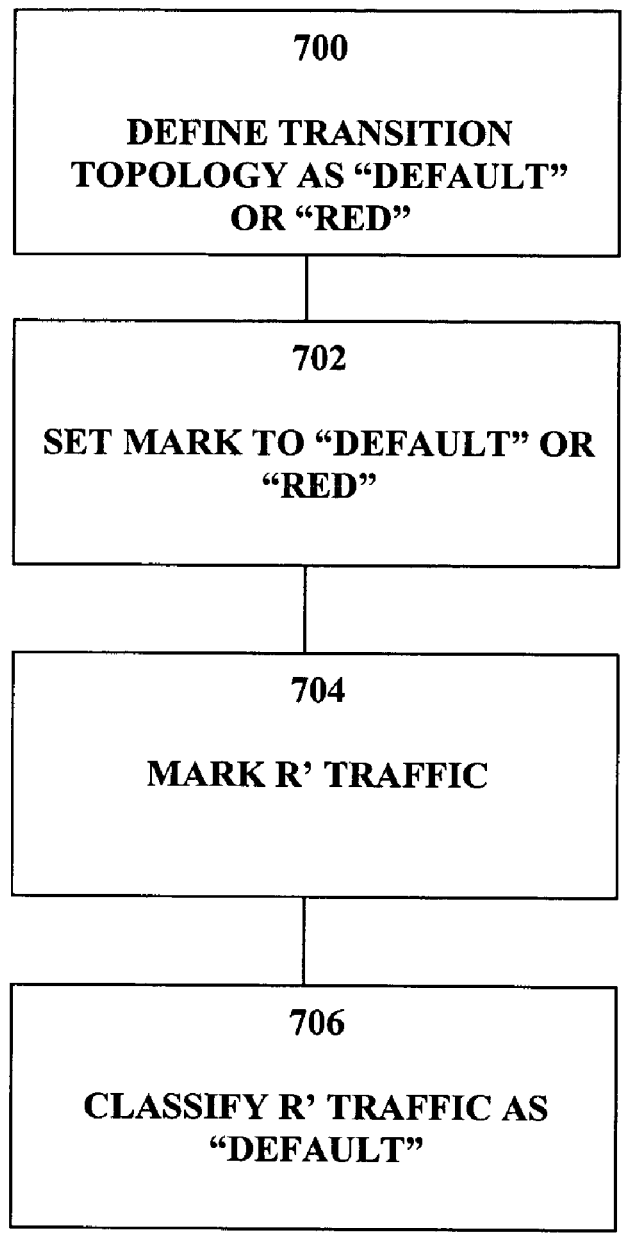
FIG. 7 is a flow diagram illustrating in more detail steps involved in removing packets from an additional topology classification.

FIG. 7 is a flow diagram illustrating in more detail the method applied in the case where packets are removed from a classification. For example for the purposes of clarity of explanation, two classes of packet, R, R' are assigned to established topology, for example, a red topology, and it is desired to remove the class of packets R' from the red topology and assign those packets to the default topology. The same approach can be adopted, essentially, as that for removing a classification altogether.

It will be noted that there is no topology to define as the R' packets will be travelling in the default topology once the transition is completed. In block 700 the transition topology is defined as default or red. In block 702 the mark is set to default or red accordingly. In block 704 R' traffic is marked and, once the marking strategy has been implemented in all participating nodes, the R' traffic is classified as default.

Figure 8:
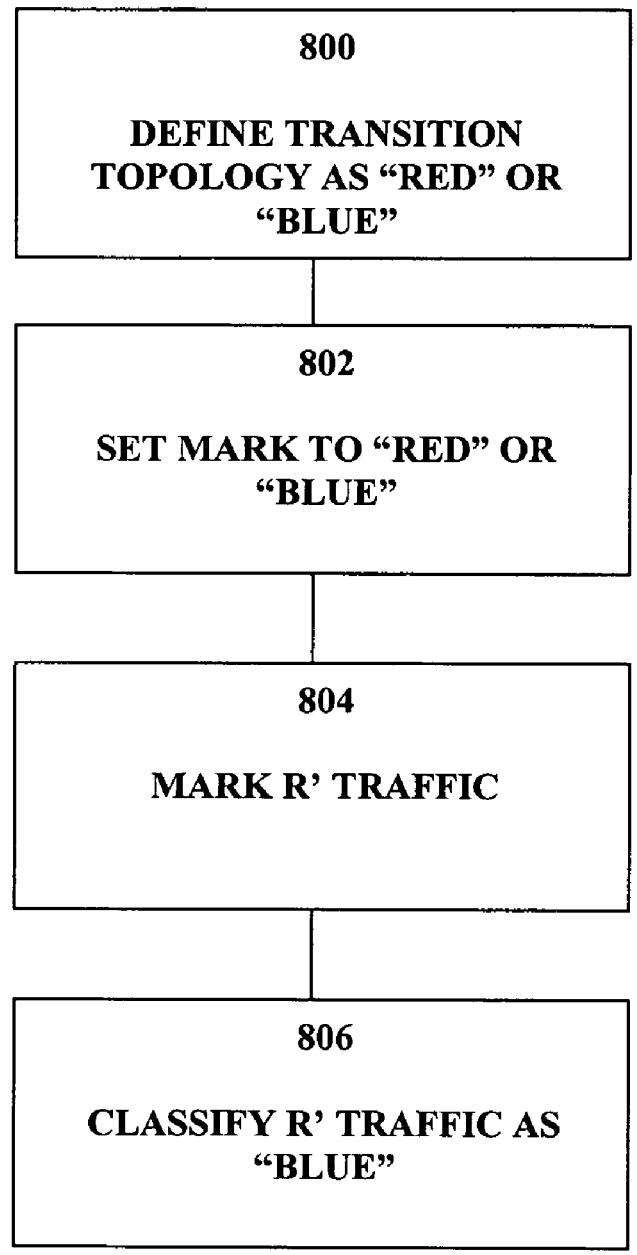
FIG. 8 is a flow diagram illustrating in more detail the steps involved in changing the additional topology classification of a data packet.

FIG. 8 shows a flow diagram illustrating in more detail the method applied in the case where a class of packets is switched between two active additional topologies. For the purposes of clarification of explanation a possible example is where a set of packets R' is classified as red for forwarding in a red topology and it is desired to classify them as blue for forwarding in a blue topology. An example may be where a class of data is classified for a QoS reason and it is desired to move it to another topology for improving QoS.

Although it would be possible simply to remove the class from the red topology in the manner discussed above with reference to FIG. 7, and then to add the class of packets R' to the blue topology in the manner described above with reference to FIG. 6A or 6B this would be inappropriate for various reasons. For example in strict mode this would mean that some packets would be passed through the default network in the interim which is impermissible. Alternatively where, in the example above, the transition is to improve service, then for a time the R' packets would be carried in default as a result of which the improved QoS might not be realized.

Another alternative would be to simply drop R' traffic during transition but this of course would disrupt traffic.

Accordingly, FIG. 8 shows an optimized implementation. Once again the steps taken are similar to those for introduction of a first additional topology however no new topology needs to be defined as the blue topology already exists and can reach all relevant destinations.

In block 800 the transition topology is defined as red or blue—in the case where all routers have both red and blue links, i.e. all nodes are in both topologies, either can be selected. In block 802 the mark is set to the transition topology once again. This can be carried out for all nodes or just the nodes in the red/blue topologies. In block 804 R' traffic is marked and hence locked into the transition topology. In block 806, once all nodes have implemented the marking strategy, R' traffic is classified as blue.

Once again it will be seen that this approach avoids loops. For example if the red topology is selected as the transition topology (which would be appropriate if all routers in the red topology were also in the blue topology) then marked traffic will travel in the red topology because the routers have not been updated or because they have been updated and marking has taken priority. Once R' traffic is classified as blue it will either travel in blue or be marked and sent to its destination in red.

It will be appreciated that the method described above can support multi-topology routing in either of the strict or preferred modes. For example in the case of introduction of an additional topology, in the preferred mode only the routers involved in the additional topology need to participate in the algorithm whereas in strict mode all routers which need to force topology observance need to participate in order that any routers unable to find a path in the additional topology to the packet destination will discard the corresponding traffic.

Where a topology is being removed, and the additional topology was in strict mode then a decision has to be made for example at administrator level as to whether the former packets in the strict mode can be set as default or whether they should be discarded. In the case of addition of packets to a classification to be carried in a strict mode topology then the additional topology can be used as the transition topology although this may not be of great significance as the packets were previously carried in the default topology in any case.

As discussed above the transition topology can be one of various active topologies or a union of active topologies. Alternatively the transition topology can be defined separately (although this is likely to increase the computational burden and time for the transition to take place). The transition topology must, however, consist of all nodes common both to the new and old topologies and selection of one of the old or new topologies is an optimization as these topologies are clearly already defined.

The mechanisms by which the methods and optimizations discussed above are implemented will be well known to the skilled reader and do not require detailed discussion here. For example any manner of classifying data packets and recognizing the different classes can be adopted. Similarly any manner of marking the packets and identifying the marked packets can be adopted. Prioritization of marked packets and assignment of those packets to the transition topology can be built in at each node or appropriate instructions can be carried by the marked packets.

4.0 Implementation Mechanisms—Hardware Overview

Figure 9:
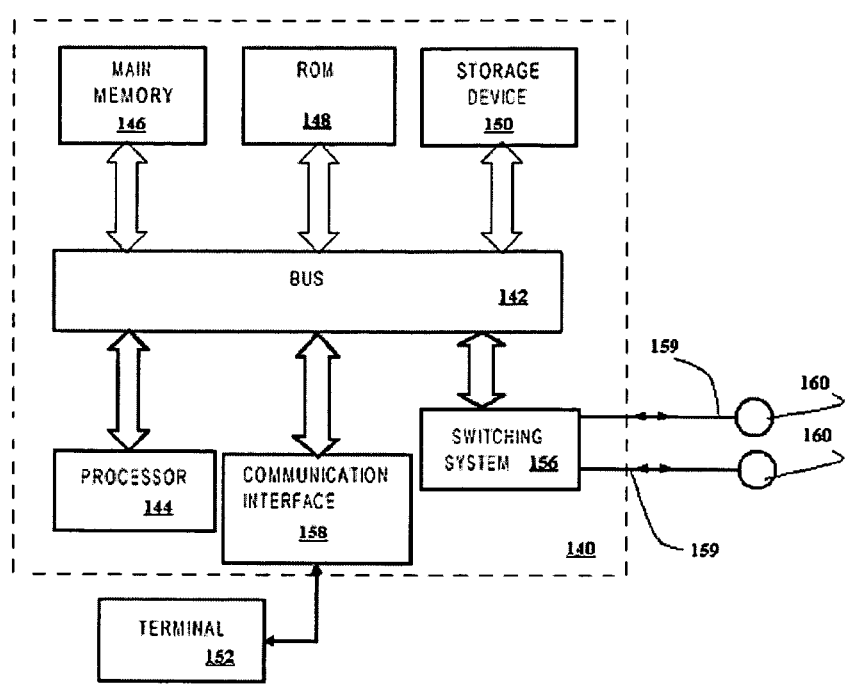
FIG. 9 is a block diagram that illustrates a computer system on which a method of managing a transition between topologies may be implemented.

FIG. 9 is a block diagram that illustrates a computer system 140 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router acting as a participating node the above described method of managing a topology transition. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions And Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Any appropriate routing protocol and mechanism can be adopted to implement the invention. Aspects from the examples and embodiments described can be juxtaposed or interchanged as appropriate.

It will be appreciated that any appropriate routing protocol can be used such as Intermediate System—Intermediate System (IS-IS) or Open Shortest Path First (OSPF). Similarly any appropriate network can provide the platform for implementation of the method. The method can be applied to IP routing or any other multi-topology routing. Any appropriate marking or signaling method can similarly be adopted.

What is claimed is:

1. A method of managing a transition for a class of data between first and second topologies in a data communications network comprising a plurality of nodes and supporting multiple topologies, the method comprising the steps, performed at a participating node of:
   defining a transition topology that is used temporarily during a routing transition from the first network topology to the second network topology;
   marking data in said class as assigned to the transition topology;
   wherein the marking constrains the data to travel in the transition topology assigned to the marking;
   forwarding marked data in said class only among nodes within said transition topology;
   ceasing marking data when all participating nodes in the network have implemented the marking step; and
   subsequently forwarding data in said class via the second topology.

2. A method as claimed in claim 1 in which the participating node signals all other participating nodes when the participating node has implemented the marking step.

3. A method as claimed in claim 1 in which the participating node ceases marking after a time out period.

4. A method as claimed in claim 1 in which the participating node is manually switched to cease marking data.

5. A method as claimed in claim 1 in which one of the first and second topologies is a default topology.

6. A method as claimed in claim 1 in which one of the first and second topologies is an additional topology.

7. A method as claimed in claim 1 in which the transition topology is one of the first or second topologies.

8. A method as claimed in claim 1 in which the participating node is any node in the network.

9. A method as claimed in claim 1 in which the participating node is a node in one of the first and second topologies.

10. A method as claimed in claim 1 further comprising the steps of:
    initially defining a second topology; and
    commencing defining the transition topology once the second topology has been defined.

11. A method as claimed in claim 1 wherein the step of forwarding the marked data comprises tunneling the marked data to its destination.

12. A method as claimed in claim 1 in which the transition topology is a default topology.

13. A method as claimed in claim 1 in which the transition topology is defined as a union of the first topology and the second topology, wherein the first topology and the second topology are operating in a strict mode.

14. A computer readable medium comprising one or more sequences of instructions for forwarding data in a data communications network which when executed by one or more processors, cause the one or more processors to perform:
    defining a transition topology that is used temporarily during a routing transition from the first network topology to the second network topology;
    marking data in said class as assigned to the transition topology;
    wherein the marking constrains the data to travel in the transition topology assigned to the marking; and
    forwarding marked data in said class only among nodes within said transition topology;
    ceasing marking data when all participating nodes in the network have implemented the marking step;
    subsequently forwarding data in said class via the second topology.

15. An apparatus for managing a transition for a class of data between first and second topologies in a data communications network comprising a plurality of nodes and supporting multiple topologies, the apparatus comprising:
    means for defining a transition topology that is used temporarily during a routing transition from the first network topology to the second network topology;
    means for marking data in said class as assigned to the transition topology;
    wherein the marking constrains the data to travel in the transition topology assigned to the marking;
    means for forwarding marked data in said class only among nodes within said transition topology;
    means for ceasing marking data when all participating nodes in the network for implementing the marking step; and
    means for subsequently forwarding data in said class via the second topology.

16. An apparatus as claimed in claim 15 further comprising means for signaling all other participating nodes when the marking step has been implemented.

17. An apparatus as claimed in claim 15 further comprising means for ceasing marking after a time out period.

18. An apparatus as claimed in claim 15 further comprising means for manually switching a node to cease marking data.

19. An apparatus as claimed in claim 15 in which one of the first and second topologies is a default topology.

20. An apparatus as claimed in claim 15 in which one of the first and second topologies is an additional topology.

21. An apparatus as claimed in claim 15 in which the transition topology is one of the first or second topologies.

22. An apparatus as claimed in claim 15 in which the means for defining a transition topology, marking data and forwarding marked data comprise any node in the network.

23. An apparatus as claimed in claim 15 in which the means for defining a transition topology, marking data and forwarding marked data is a node in one of the first and second topologies.

24. An apparatus as claimed in claim 15 further comprising:
    means for initially defining a second topology; and
    means for commencing defining the transition topology once the second topology has been defined.

25. An apparatus as claimed in claim 15 wherein the means for forwarding marked data comprises means for tunneling the marked data to its destination.

26. An apparatus for managing a transition for a class of data between first and second topologies in a data communications network, the apparatus comprising:
    one or more processors; and
    a network interface communicatively coupled to the one or more processors and configured to communicate one or more packet flows among the one or more processors and a network and a computer readable medium comprising one or more sequences of instructions for managing a transition for a class of data between first and second topologies in a data communications network which, when executed by said one or more processors, cause the one or more processors to perform:

defining a transition topology that is used temporarily during a routing transition from the first network topology to the second network topology;

marking data in said class as assigned to the transition topology;

wherein the marking constrains the data to travel in the transition topology assigned to the marking; and forwarding marked data in said class only among nodes within said transition topology;

ceasing marking data when all participating nodes in the network have implemented the marking step;

subsequently forwarding data in said class via the second topology.

* * * * *